(12) United States Patent  
Krishnan et al.

(10) Patent No.: US 6,710,890 B1  
(45) Date of Patent: Mar. 23, 2004

(54) SUBSTRATE THICKNESS DETERMINATION

(75) Inventors: Shankar Krishnan, Santa Clara, CA (US); Christopher M. Pohlhammer, San Ramon, CA (US); Michael P. Green, Palo Alto, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 0 days.

(21) Appl. No.: 10/375,554

(22) Filed: Feb. 26, 2003

(51) Int. Cl.$^7$ ............................................... G01B 11/06
(52) U.S. Cl. .................................. 356/630; 250/559.28
(58) Field of Search ................................... 356/630, 631, 356/636, 503, 394; 250/560, 559.29; 382/8, 41

(56) References Cited

U.S. PATENT DOCUMENTS

| | | | | |
|---|---|---|---|---|
| 4,168,437 A | * | 9/1979 | Nihonmatsu | 250/559.2 |
| 4,674,883 A | * | 6/1987 | Baurschmidt | 356/630 |
| 4,929,845 A | * | 5/1990 | Amir et al. | 250/559.05 |
| 5,048,965 A | * | 9/1991 | Amir | 356/604 |
| 5,075,559 A | * | 12/1991 | Amir | 250/559.27 |
| 5,097,516 A | * | 3/1992 | Amir | 382/274 |
| 5,129,724 A | * | 7/1992 | Brophy et al. | 356/503 |
| 5,671,054 A | * | 9/1997 | Iwasaki | 356/631 |

OTHER PUBLICATIONS

Alpha–Step IQ brochure from KLA–Tencor Technologies Corporation Web site, printed Feb. 26, 2003.
Alpha–Step 500 brochure from KLA–Tencor Technologies Corporation Web site, printed Feb. 26, 2003.
FLX–2320 brochure from KLA–Tencor Technologies Corporation Web site, printed Feb. 26, 2003.
P–15 of brochure from KLA–Tencor Technologies Corporation Web site, printed Feb. 26, 2003.
ASET–F5x brochure from KLA–Tencor Technologies Corporation Web site, printed Feb. 26, 2003.
NanoPro NP1 brochure from KLA–Tencor Technologies Corporation Web site, printed Feb. 26, 2003.
P–15 brochure from KLA–Tencor Technologies Corporation Web site, printed Feb. 26, 2003.

* cited by examiner

Primary Examiner—Frank G. Font
Assistant Examiner—Sang H. Nguyen
(74) Attorney, Agent, or Firm—Luedeka, Neely & Graham, P.C.

(57) ABSTRACT

An apparatus for measuring a thickness of a substrate having an upper surface, without contacting the upper surface of the substrate. A platen having a base surface receives the substrate, and a reference surface is disposed at a known first height from the platen surface. A non contact sensor senses the known first height of the reference surface without making physical contact with the reference surface. The non contact sensor further senses a relative difference between the known first height of the reference surface and a second height of the upper surface of the substrate without making physical contact with the upper surface of the substrate. A controller controls the sensor and determines the thickness of the substrate based at least in part on the known first height of the reference surface and the relative difference between the known first height of the reference surface and the second height of the upper surface of the substrate.

20 Claims, 1 Drawing Sheet

SUBSTRATE THICKNESS DETERMINATION

FIELD

This invention relates to the field of instrumentation. More particularly, this invention relates to non contact methods of determining the thickness of substrates, such as those used in the microelectronics industry.

BACKGROUND

As integrated circuits are fabricated to increasingly smaller dimensions, they have tended to become more sensitive to process and material variability. For example, variations in material properties such as substrate thickness and stress can effect the physical and electrical properties of the thin layers of material that are formed on the substrate surface as a part of the integrated circuit fabrication process. For reasons such as this, strict standards have been promulgated for substrate characteristics. For example, SEMI standards dictate that prime grade silicon substrates are to have a thickness of between about seven hundred-seventy five microns and about eight hundred microns. Thus, other substrate characterizations, such as stress measurements, are calculated with the assumption that the substrate thickness is within this range.

However, some processes are more tolerant of variation in substrate thickness than are others, and so in an effort to reduce the cost of the substrates used for such, manufacturers of such devices have started to purchase reclaimed substrates, which have a thickness in the general range of from about six hundred microns to about eight hundred microns. In other words, these reclaimed substrates have typically been thinned to some degree as compared to a prime grade substrate. For those that use these reclaimed substrates, and also for other manufacturers who must have a very precise substrate thickness measurement, it is not acceptable to merely assume that a given substrate falls within a given thickness range.

Thus, many manufacturers desire to perform their own thickness measurements on a sampling, or all, of the substrates that they process. Unfortunately, the traditional method of substrate thickness measurement is somewhat cumbersome. Typically, the substrate must be weighed on a mass balance with a high degree of precision. Then the thickness of the substrate is calculated using two other pieces of information, where the first is one of either an assumed or a measured substrate diameter, and the second is one of either an assumed or a measured substrate density. Of course, if the assumed values are inaccurate, then the calculated substrate thickness determination will also be inaccurate. On the other hand, if diameter and density measurements are also performed, then the already lengthy and cumbersome process of finding the thickness of the substrate is made additionally difficult, time consuming, and costly.

What is needed, therefore, is a system by which substrate thickness can be determined more accurately, more quickly, and preferably using instrumentation that a manufacturer might already own.

SUMMARY

The above and other needs are met by an apparatus for measuring a thickness of a substrate having an upper surface, without contacting the upper surface of the substrate. A platen having a base surface receives the substrate, and a reference surface is disposed at a known first height from the platen surface. A non contact sensor senses the known first height of the reference surface without making physical contact with the reference surface. The non contact sensor further senses a relative difference between the known first height of the reference surface and a second height of the upper surface of the substrate without making physical contact with the upper surface of the substrate. A controller controls the sensor and determines the thickness of the substrate based at least in part on the known first height of the reference surface and the relative difference between the known first height of the reference surface and the second height of the upper surface of the substrate.

In this manner the substrate thickness is directly measured without contacting the surface of the substrate. Thus, there is no reliance on the potentially inaccurate assumption of a substrate density or diameter, nor is there the need to measure a density or diameter. Further, by sensing the thickness in a non contact manner, the measurement can be taken very quickly and without potential damage to the substrate. Therefore, the thickness measurement can be taken on a large sampling of substrates, or on all of the substrates, as desired.

In various preferred embodiments the reference surface is mounted to the platen.

Preferably the reference surface comprises a plurality of references surfaces, each having a known first height, where the reference surfaces are mounted at a plurality of locations on the platen. The reference surface in one embodiment has a plurality of surfaces disposed at a plurality of known heights. Most preferably the first height of the reference surface is between about six hundred microns and about eight hundred microns.

The non contact sensor is preferably an optical sensor that senses the height of a surface by focusing on the surface. Preferably there is also a coarse adjustment and a fine adjustment under the control of the controller, and the known first height of the reference to surface is sensed with the coarse adjustment, and the relative difference between the known first height and the second height of the upper surface of the substrate is sensed with the fine adjustment. In one embodiment separate non contact sensors are used to sense the first height and the second height.

A motor preferably moves one of the platen and the non contact sensor relative to each other for the different height sensing operations. The motor translates or rotates one of the substrate and the sensor relative to each other. Most preferably the motor moves the platen and the substrate relative to the sensor. The controller is preferably a general purpose computer.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
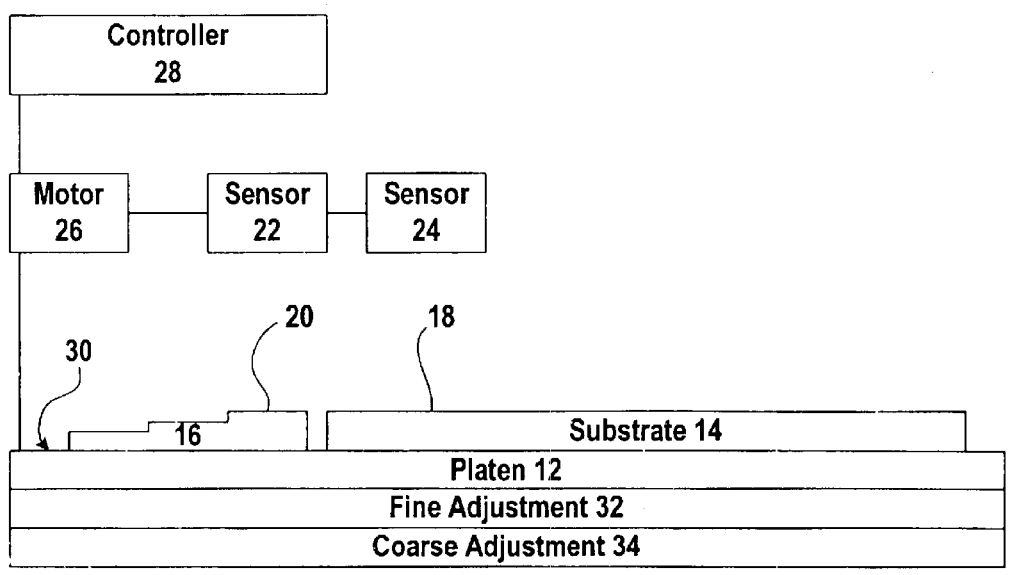
FIG. 1 is a functional block diagram of an apparatus according to an embodiment of the invention.

With reference now to FIG. 1 there is depicted a functional block diagram of an apparatus 10 according to an embodiment of the invention, for measuring the thickness of a substrate 14, which is most preferably a silicon substrate. As depicted in FIG. 1, the substrate 14, for which the thickness is to be determined, is placed on an upper surface of a platen 12, which has a base surface 30. The base surface 30 is preferably extremely flat and level relative to other portions of the system 10, so that sensed variations in heights, as described in more detail below, are attributable to actual thickness differences in the substrate 14, rather than the flatness or level of the base surface 30 of the platen 12.

A reference block 16 is preferably mounted on the platen 12, such as on the base surface 30. The reference block 16 has a reference surface 20 that is disposed at a known first height above the base surface 30 of the platen 12. In one embodiment the reference block 16 has just a single reference surface 20, and in alternate embodiments the reference block 16 has multiple reference surfaces 20, which are disposed at differing known first heights above the base surface 30 of the platen 12.

Although just a single reference surface 20 is sufficient for most purposes, it may be useful in some embodiments to have multiple reference surfaces 20 at different known first heights when it is anticipated that substrates 14 having a wide variety of the thicknesses will be measured. Thus, having reference surfaces 20 that are relatively close in height to the varying thicknesses of the substrates 14 to be measured may be desirable in those embodiments. As the substrate 14 to be measured is typically within a range of from about six hundred microns to about eight hundred microns, it is preferred that the known first height or heights of the reference surface 20 be disposed within that range.

The reference block 16 is preferably disposed so as to be adjacent the substrate 14, or very nearly so, without any appreciable gap between the two. In this manner the relative positions between a measurement location on the reference block 16 and a measurement location on the substrate 14 are not separated by a distance that is any greater than is necessary, and possible confounding parameters, such as the flatness of the platen 12, are generally reduced and have less of an impact on the resultant measurements.

The reference surface 20 of the reference block 16 is preferably formed of the same material as that of the upper surface 18 of the substrate 14 to be measured, although this is not a necessity. The purpose for this preference is that the sensing of the height of the surfaces 20 and 18, as described in more detail below, might be more accurately accomplished in some embodiments when both of the surfaces 20 and 18 are formed of the same material.

Figure 2:
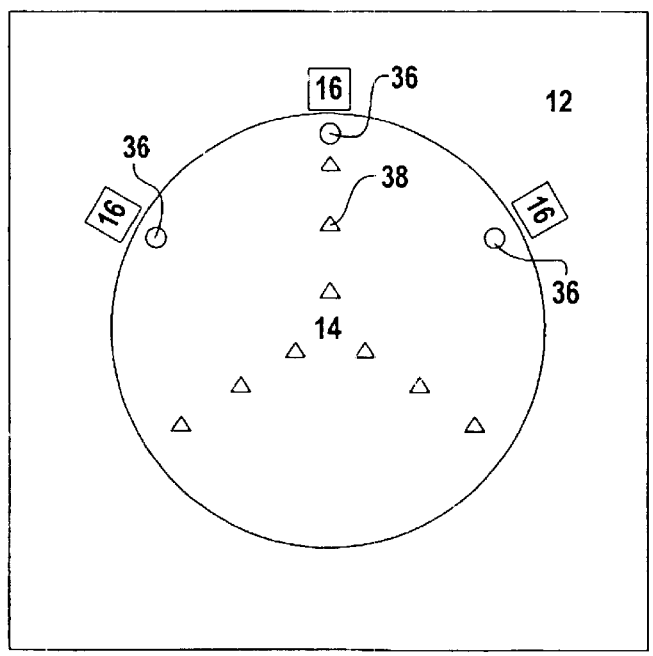
FIG. 2 is a top plan view of a portion of an apparatus according to an embodiment of the invention.

As depicted in FIG. 2, in a preferred embodiment there are several reference blocks 16 disposed on the plate 12 around the perimeter of the substrate 14. It is appreciated that the examples of one or three reference blocks 16 as depicted in the figures is exemplary only, and that in actual embodiments there may be any number of reference blocks 16. In addition, each of the reference blocks 16 may have one or more reference surfaces 20, as described above. Further, the reference blocks 16 do not all need to have the same number of reference surfaces 20.

The height of the reference surface 20 is preferably sensed by a non contact sensor 22, without making physical contact with the reference surface 20. This can be accomplished in a variety of ways, but most preferably the sensor 22 is an optical sensor that senses the height of the reference surface 20 by focusing on the reference surface 20 as the platen 12 is raised and lowered. In other embodiments a thermal or acoustic sensor could be used. The height of the reference surface 20 above the base surface 30 of the platen 12 is known, and entered into a controller 28. When the sensor 22 has sensed the height of the reference surface 20, then the parameters of either or both of the sensor 22 or the height adjustment of the platen 12 used to achieve the focus are recorded, and the controller 28 associates those parameters with the known height of the reference surface 20. This reference procedure can be selectively repeated for any or all of the reference surfaces 20 as available or desired.

A second unknown height of the upper surface 18 of the substrate 14 is also sensed. This can be accomplished in a variety of ways. In one embodiment one or more separate sensors 24, that have been calibrated against the first sensor 22, are used to sense the height of the surface 18 of the substrate 14. It is appreciated that there may then be one sensor 22 that does all of the height sensing described herein, or separate sensors 22 and 24 for each of the different heights sensing operations as described herein, or some intermediate number of sensors 22 and 24.

In a most preferred embodiment, there is only a single sensor 22, and the platen 12 is moved underneath the sensor 22, such as by a motor 26. It is appreciated that the sensor 22, or sensors 22 and 24, could alternately be moved by the motor while the platen 12 remains stationary. In this embodiment, the sensor 22 is used to sense the height of the reference surface 20, as described above, and is also used to sense the height of the upper surface 18 of the substrate 14. The controller 28 controls the sensor 22 during the sensing operations, correlates the information received from the sensor 22 with the known height of the reference surface 20, and determines the height of the upper surface 18 of the substrate 14, thus determining the thickness of the substrate 14.

In a most preferred embodiment, the height of the reference surface 20 and the height of the upper surface 18 of the substrate 14 is sensed in the following manner. The sensor 22 is focused on the reference surface 20 using a coarse height adjustment 34 of the platen 12, while a fine adjustment 32 is set to an intermediate position in the range of the fine adjustment 32. Preferably the coarse adjustment 34 and fine adjustment 32 adjust the height of the platen 12 relative to the sensor 22. Most preferably, the fine adjustment 32 is designed to have less runout and backlash than the coarse adjustment 34. In a most preferred embodiment, the coarse adjustment 34 is a belt driven servo stage having a total height adjustment of as much as about three millimeters, and the fine adjustment 32 is a piezoelectric driven stage having a total height adjustment of as much as about three hundred microns.

As previously mentioned, the settings for the fine adjustment 32, coarse adjustment 34, and sensor 22 when it is focused on the reference surface 20, or in other words when the height of the reference surface 20 has been sensed, are recorded by the controller 28. The platen 12 is then moved to bring a location of the substrate 14 under the sensor 22. The sensor 22 is then focused on the upper surface 18 of the substrate 14 at that location, preferably using just the fine adjustment of the sensor 22.

When the sensor 22 is focused on the upper surface of the substrate 14, the controller records the difference that has been made in the fine adjustment 32, which was required to move the focal point from the known height of the reference surface 20 to the unknown height of the upper surface 18 of the substrate 14. Using the previously entered physical characteristics of the sensor 22, and the change in the fine adjustment 32 that was needed to shift the focus from the reference surface 20 to the upper surface 18 of the substrate 14, the controller 28 then determines the difference in height between the reference surface 20 and the upper surface 18 of the substrate 14. The difference in height is either added to or subtracted from the known height of the reference surface 20 as appropriate, which yields the actual height of the upper surface 18 of the substrate above the base surface 30 of the platen 12. It is assumed that the substrate 14 is in intimate contact with the base surface 30 of the platen 12, and that all of the height of the substrate 14 above the base surface 30 of the platen 12 is attributable to the thickness of the substrate 14.

The fine adjustment 32 is preferably used to sense the difference in the heights of the reference surface 20 and the upper surface 18 because the focus can be more finely adjusted using the fine adjustment 32, and thus a more accurate determination of the thickness of the substrate 14 can be made when using the fine adjustment 32.

Most preferably, the thickness measurement system as described above is incorporated into a film stress analyzer, such as the ASET F5x as manufactured by KLA-Tencor Technologies Corporation of San Jose Calif. There are several advantages to such an adaptation of the stress analyzer. To begin with, the stress analyzer such as that mentioned already has much of the physical equipment that is required, such as a movable platen, an optical sensor, and a controller. Thus, in simple terms, all that is required is to modify the platen 12 with the reference blocks 16, and to update the controller software to make the necessary measurements and calculations as described above.

In addition, modification of a stress analyzer to measure substrate thickness is desirable because the stress calculations are highly dependent upon substrate thickness. Thus, if the substrate thickness that is assumed for the stress calculations is incorrect, the stress calculations can be extremely inaccurate. Therefore, a direct and relatively quick and easy measurement of the substrate thickness prior to calculating stress is extremely beneficial in increasing the accuracy of the stress analysis.

In various embodiments the height of a number of locations on the upper surface 18 of the substrate 14 are sensed, so that a very representative average thickness value can be determined by the controller 28. Thus, a given embodiment of the system as described above may use between one and several hundred such height determinations on the substrate 14, depending upon criteria such as the uniformity of thickness of the substrate 14 and the level of accuracy for thickness measurement that is desired. Similarly, either a very small or a very large number of reference surfaces 20 may be desired for a given thickness determination, depending upon the degree of accuracy desired.

For example, as depicted in FIG. 2, a plurality of different measurement sites on the substrate 14 is preferably used. Most preferably, the measurement sites 36 on the substrate 14 are measured. However, if it is suspected that the substrate 14 has a non uniform thickness, such as planar but non parallel surfaces, or a convex or concave top surface, or a wavy top surface, then preferably additional measurement sites 38 are used to determine the substrate 14 thickness. For a quadratically dished top surface in particular, measurement sites 38 radially disposed at about seventy percent of the substrate 14 radius tend to be an optimal location for thickness measurement.

The system 10 is preferably calibrated by using one or more substrates 14 having a known and preferably extremely uniform thickness. The thicknesses of the calibration substrates 14 are preferably determined according to any one or more standard acceptable practices in the industry, such as by weighing the substrate 14, and then using an assumed diameter and density to determine the thickness. These calibrated substrates 14 are then measured using the system 10 and the methods described above, while the system 10 is in special calibration mode, wherein the measured thickness values are calibrated to equal the known thickness values for the calibration substrate 14. Such a calibration procedure is also beneficial to remove any non uniformities in the level or flatness of the platen 12, or in the system that moves the platen 12 under the sensor 22.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations arc within the scope of the invention as determined by the appended claims when interpreted in accordance with the breadth to which they are fairly, legally, and equitably entitled.

What is claimed is:

1. An apparatus for measuring a thickness of a substrate having an upper surface, without contacting the upper surface of the substrate, comprising:

a platen having a base surface for receiving the substrate, a reference surface disposed at a known first height from the platen surface, a non contact sensor adapted for sensing the known fist height of the reference surface without macing physical contact with the reference surface, the non contact sensor further adapted for sensing a relative difference between the known first height of the reference surface and a second height of the upper surface of the substrate without making physical contact with the upper surface of the substrate, a controller for controlling the sensor and for determining the thickness of the substrate based at least in part on the known first height of the reference surface and the relative difference between the known first height of the reference surface and the second height of the upper surface of the substrate, and a coarse adjustment and a fine adjustment controlled by the controller where the known first height of the reference surface is sensed with the coarse adjustment while setting the fine adjustment to an intermediate position and the relative difference between the known first height and the second height of the upper surface of the substrate is sensed with the fine adjustment.

2. The apparatus of claim 1, wherein the reference surface is mounted to the platen.

3. The apparatus of claim 1, wherein the reference surface comprises a plurality of reference surfaces, each having a known first height, mounted at a plurality of locations on the platen.

4. The apparatus of claim 1, wherein the reference surface has a plurality of surfaces disposed at a plurality of known heights.

5. The apparatus of claim 1, wherein the first height of the reference surface is between about six hundred microns and about eight hundred microns.

6. The apparatus of claim 1, wherein the non contact sensor is an optical sensor that senses height of a surface by focusing on the surface.

7. The apparatus of claim 1, wherein the coarse adjustment is a belt driven servo state and the fine adjustment is a piezoelectric driven stage.

8. The apparatus of claim 1, further comprising a motor adapted for moving one of the platen and the non contact sensor relative to each other.

9. The apparatus of claim 3, wherein the motor translates one of the substrate and the sensor relative to each other.

10. The apparatus of claim 8, wherein the motor rotates one of the substrate and the sensor relative to each other.

11. The apparatus of claim 8, wherein the motor moves the platen and substrate relative to the sensor.

12. The apparatus of claim 1, wherein separate non contact sensors are used to sense the first height and the second height.

13. The apparatus of claim 1, wherein the controller is a general purpose computer.

14. An apparatus for measuring a thickness of a substrate having an upper surface, without contacting the upper surface of the substrate, comprising:
   a platen having a base surface for receiving the substrate,
   a plurality of reference surfaces disposed at a known set of fist heights from the platen surface, the plurality of reference surfaces mounted to the platen,
   a non contact optical sensor adapted for sensing the known set of first heights of the plurality of reference surfaces without making physical contact with the plurality of reference surfaces by focusing on each of the plurality of reference surfaces,
   a motor adapted for moving the platen and the substrate relative to the non contact optical sensor,
   the non contact sensor further adapted for sensing a set of relative differences between the known set of first heights of the plurality of reference surfaces and a set of second heights of the upper surface of the substrate at a plurality of locations on the upper surface of the substrate without making physical contact with the upper surface of the substrate,
   a controller for controlling the motor and the sensor and for determining the thickness of the substrate at the plurality of locations on the upper surface of the substrate based at least in part on the known set of first heights of the plurality of reference surfaces and the set of relative differences between the known set of first heights of the plurality of reference surfaces and the set of second heights of the upper surface of the substrate,
   a coarse adjustment and a fine adjustment controlled by the controller, where the known fist height of the reference surface is sensed with the coarse adjustment while setting the fine adjustment to an intermediate position, and the relative difference between the known first height and the second height of the upper surface of the substrate is sensed with the fine adjustment.

15. The apparatus of claim 14, wherein each reference surface has a plurality of surfaces disposed at a plurality of known heights.

16. The apparatus of claim 14, wherein the first height of the reference surface is between about six hundred microns and about eight hundred microns.

17. The apparatus of claim 14, further comprising a wherein the coarse adjustment is a belt driven servo stage and the fine adjustment is a piezoelectric driven stage.

18. The apparatus of claim 14, wherein the controller is a general purpose computer.

19. A method for measuring a thickness of a substrate having an upper surface, without contacting the upper surface of the substrate, the method comprising the steps of:
   disposing the substrate on a base surface of a platen,
   sensing with a coarse adjustment a known first height of a reference surface mounted to the platen without making physical contact with the reference surface,
   sensing with a fine adjustment a relative difference between the known first height of the reference surface and a second height of the upper surface of the substrate without making physical contact with the upper surface of the substrate, and
   determining the thickness of the substrate with a controller, based at least in part on the known first height of the reference surface and the relative difference between the known first height of the reference surface and the second height of the upper surface of the substrate.

20. The method of claim 19, wherein the step of sensing a known first height of a reference surface comprises sensing a known set of first heights of a plurality of references surfaces that are mounted at a plurality of locations on the platen.

* * * * *